(12) United States Patent
Wang et al.

(10) Patent No.: US 7,196,147 B2
(45) Date of Patent: Mar. 27, 2007

(54) OLEFIN POLYMERIZATION PROCESS WITH IMPROVED OPERABILITY AND POLYMER PROPERTIES

(75) Inventors: Shaotian Wang, Mason, OH (US); Kenneth J. Klug, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 11/172,730

(22) Filed: Jul. 1, 2005

(65) Prior Publication Data

US 2007/0004881 A1    Jan. 4, 2007

(51) Int. Cl.
*C08F 4/50* (2006.01)
*C08F 4/76* (2006.01)

(52) U.S. Cl. .................. 526/114; 526/113; 526/116; 526/172; 526/161

(58) Field of Classification Search .......... 526/172, 526/161, 126, 134, 348, 113, 114, 116, 170
See application file for complete search history.

(56) References Cited

U.S. PATENT DOCUMENTS

| | | | |
|---|---|---|---|
| 5,153,157 A | 10/1992 | Hlatky et al. ............... | 502/117 |
| 5,198,401 A | 3/1993 | Turner et al. ............... | 502/155 |
| 5,241,025 A | 8/1993 | Hlatky et al. ............... | 526/129 |
| 5,414,180 A | 5/1995 | Geerts et al. ............... | 585/525 |
| 5,648,440 A | 7/1997 | Sugano et al. ............... | 526/132 |
| 6,232,260 B1 | 5/2001 | Nagy et al. ................ | 502/155 |
| 6,451,724 B1 | 9/2002 | Nifant'ev et al. .......... | 502/103 |
| 6,559,251 B1 | 5/2003 | Wang et al. ................ | 526/127 |
| 6,693,155 B1 | 2/2004 | Meverden et al. .......... | 526/160 |
| 6,794,468 B1 | 9/2004 | Wang ........................ | 526/161 |
| 6,818,713 B1 | 11/2004 | Wang et al. ................ | 526/161 |
| 6,838,410 B2 | 1/2005 | Wang et al. ................ | 502/103 |
| 6,908,972 B2 * | 6/2005 | Tsuie et al. ................. | 526/160 |
| 6,933,353 B2 * | 8/2005 | Wang ........................ | 526/114 |

FOREIGN PATENT DOCUMENTS

WO    WO 99/24446    5/1999
WO    WO 01/53360    7/2001

OTHER PUBLICATIONS

Jüngling et al., "Cooperative effects in binuclear zirconocenes: their synthesis and use as catalyst in propene polymerization", *Journal of Organometallic Chemistry*, 460 (1993) 191-195.
Noh et al., "Synthesis, characterization, and reactivities of the polysiloxane-bridged binuclear metallocenes tetramethyl-disiloxanediylbis(cyclopentadienyltitanium trichloride) and hexa-methyltrisiloxanediylbis (cyclopentadienyltitanium trichoride)", *Journal of Organometallic Chemistry*, 518 (1996) 1-6.
Noh et al., "Syntheses of polymethylene bridged dinuclear zirconocenes and investigation of their polymerization activities", *Journal of Organometallic Chemistry*, 580 (1999) 90-97.

* cited by examiner

*Primary Examiner*—David W. Wu
*Assistant Examiner*—Rip A. Lee
(74) *Attorney, Agent, or Firm*—Jonathan L. Schuchardt

(57) ABSTRACT

Ethylene and optional comonomers are polymerized in the presence of an organozinc compound and a catalyst system to produce an ethylene polymer. The catalyst system comprises a bridged indenoindolyl Group 3-10 transition metal complex and an activator. The organozinc compound is used in an amount effective to increase the polymer bulk density compared with that observed in the absence of the organozinc compound. The organozinc compound can also narrow the particle size distribution of the polymer and the wt. % of polyolefin chunks produced. The operability of processes utilizing bridged indenoindolyl metal complexes is enhanced while maintaining desirably high polyolefin molecular weights.

15 Claims, No Drawings

OLEFIN POLYMERIZATION PROCESS WITH IMPROVED OPERABILITY AND POLYMER PROPERTIES

FIELD OF THE INVENTION

The invention relates to olefin polymerization processes performed in the presence of particular single-site complexes. The process provides improved operability and gives polyolefins with a desirable balance of properties.

BACKGROUND OF THE INVENTION

Ziegler-Natta catalysts are a mainstay for polyolefin manufacture, but single-site (metallocene and non-metallocene) catalysts represent the industry's future. These catalysts are often more reactive than Ziegler-Natta catalysts can can give polymers with improved physical properties.

Transition metal complexes that incorporate "indenoindolyl" ligands are known (see, e.g., U.S. Pat. Nos. 6,232,260 and 6,451,724). In many of the known complexes, an indenoindolyl group is bridged to another group, which may be a second indenoindolyl group. Some of the known bridged indenoindolyl complexes have constrained geometry or "open architecture" (see, e.g., U.S. Pat. No. 6,838,410). Indenoindolyl ligands are versatile because a wide variety of indanone and arylhydrazine precursors can be used to produce indenoindoles. Thus, substituent effects can be exploited and catalyst structure can be altered to produce improved polyolefins.

Non-bridged indenoindolyl complexes generally provide good operability. They usually give polyolefins having a desirably high bulk density, narrow particle size distributions, and a low or undetectable level of polyolefin "chunks," i.e., agglomerated polymer particles. High bulk density and good resin morphology are crucial for commercial manufacturing processes because they impact cost, productivity, and process viability.

Unfortunately, non-bridged complexes are not ideal for achieving high polyolefin molecular weight or efficient comonomer incorporation. In our experience, introducing bridging into indenoindolyl complexes allows one to boost polyolefin molecular weight and to achieve desirable product density targets. However, bridging can adversely impact operability. In particular, the bridged complexes can give polyolefins with agglomerated polyolefin chunks, broad particle size distributions, and low bulk densities.

Organozinc compounds are known chain-transfer agents. Thus, when an olefin is polymerized in the presence of an organozinc compound, the expected result is a reduction in polymer molecular weight. In copending application Ser. No. 10/614,615, filed Jul. 7, 2003, now allowed, we explained the benefits of pretreating silica supports with an organozinc compound. In particular, we showed that indenoindolyl transition metal complexes supported on organozinc-treated silicas are highly active and give polyolefins with unexpectedly high molecular weight. Less than clear is the impact of using an organozinc compound in the polymerization process rather than as a component of an indenoindolyl transition metal catalyst system. Will it behave as a chain-transfer agent and reduce polymer molecular weight, will it increase molecular weight (as it did when it was part of the catalyst system), or are there other possible outcomes?

Ideally, polyolefin manufacturers could make high-molecular-weight resins using bridged indenoindolyl complexes while enjoying the operability benefits normally associated only with non-bridged varieties of these complexes. A desirable process would enable the preparation of high-molecular-weight polyolefins having a low or undetectable level of polyolefin chunks, narrow particle size distributions, and high bulk densities.

SUMMARY OF THE INVENTION

The invention is a process which comprises polymerizing ethylene in the presence of an organozinc compound and a catalyst system to produce an ethylene polymer. The catalyst system comprises a bridged indenoindolyl Group 3-10 transition metal complex and an activator. The organozinc compound is used in an amount effective to increase the polymer bulk density compared with that observed in the absence of the organozinc compound. In other aspects of the invention, the organozinc compound is used in an amount effective to narrow the particle size distribution of the polymer or to reduce the wt. % of polyolefin chunks produced. Surprisingly, the overall operability of processes utilizing bridged indenoindolyl metal complexes can be enhanced while maintaining desirably high polyolefin molecular weights.

DETAILED DESCRIPTION OF THE INVENTION

In the process of the invention, ethylene is polymerized to produce an ethylene polymer. One or more α-olefin comonomers are optionally included in the process, so suitable ethylene polymers include copolymers with α-olefins. Suitable α-olefins include, for example, propylene, 1-butene, 1-hexene, 1-octene, and the like, and mixtures thereof.

The process is performed in the presence of a catalyst system which comprises an activator and a bridged indenoindolyl Group 3–10 transition metal complex.

Suitable activators are well known in the art. Examples include alkyl alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum (i.e., ionic borates or aluminates). Examples include lithium tetrakis (pentafluorophenyl)borate, trityl tetrakis(pentafluorophenyl) borate (F20), lithium tetrakis(pentafluorophenyl)aluminate, anilinium tetrakis(pentafluorophenyl)borate, and the like. Suitable activators also include organoboranes, which include boron and one or more alkyl, aryl, or aralkyl groups. Suitable activators include organoboranes, particularly substituted and unsubstituted trialkyl and triarylboranes such as tris(pentafluorophenyl)borane (F15), triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alkyl alumoxanes, such as MAO, and mixtures of alkyl alumoxanes and ionic borates are preferred.

The optimum amount of activator needed relative to the amount of transition metal complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M. The activator can be combined with the complex and added to the reactor as a mixture, or the components can be added to the reactor separately.

"Transition metals" include members of the lanthanide series in addition to traditional transition metals. Preferably, the transition metal is a Group 3-8, more preferably a Group 3-5, and most preferably a Group 4 transition metal such as zirconium or titanium.

The transition metal complex incorporates a bridged indenoindolyl ligand bonded to the transition metal. Suitable indenoindolyl ligands and ways to name, synthesize, and incorporate them into transition metal complexes have been described in considerable detail elsewhere; see, for example U.S. Pat. Nos. 6,838,410, 6,794,468, and 6,232,260, the teachings of which are incorporated herein by reference. Suitable procedures for making the ligands and complexes also appear in PCT Int. Appls. WO 99/24446 and WO 01/53360.

By "bridged indenoindolyl ligand," we mean that the bridged indenoindolyl group can be joined to a second ligand by a divalent linking group. A wide variety of linking groups are suitable for use and are known in the art. The linking group can be a conjugated pi-electron system, but it need not be conjugated. Suitable divalent linking groups include dialkylsilyl, diarylsilyl, alkylboranyl, arylboranyl, siloxy, polysiloxy, and hydrocarbyl groups. Preferred hydrocarbyl groups are alkylene, dialkylene, polyalkylene, arylene, diarylene, polyarylene, cycloalkyl, adamantyl, aralkylene, alkenyl, and alkynyl. Specific examples of suitable divalent linking groups are methylene, 1,2-dimethylene, polymethylene, 1,2-ethenyl, 1,2-ethynyl, isopropylidene, 1,4-phenylene, α,α'-xylyl, 4,4'-biphenylene, 1,3-adamantyl, 1,4-adamantyl, phenylboranyl, methylboranyl, dimethylsilyl, diphenylsilyl, bis(dimethylsilyl), oxybis(dimethylsilyl), and the like. For some additional examples, see *J. Organometal. Chem.* 460(1993)191;518(1996)1;580(1999)90.

The divalent linking group can link the indenoindolyl ligand to a polymerization-stable ligand. Suitable polymerization-stable ligands include cyclopentadienyl, indenyl, fluorenyl, boraaryl, indenoindolyl, and the like.

The indene and indole rings can be fused in either an indeno[1,2-b]indolyl or an indeno[2,1-b]indolyl configuration. See U.S. Pat. No. 6,559,251 for an explanation of the distinction.

Bridged indenoindolyl ligands also include those used in open architecture complexes. By "open architecture," we mean a complex having a fixed geometry that enables generation of a highly exposed active site when the complex is combined with an activator. The metal of the complex is pi-bonded to the indenyl Cp ring and is also sigma-bonded through two or more atoms to the indolyl nitrogen or the indenyl methylene carbon. Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to either the indolyl nitrogen atom or the indenyl methylene carbon. For examples of "open architecture" complexes and how to make them, see U.S. Pat. Nos. 6,559,251, 6,693,155, and 6,818,713, the teachings of which are incorporated herein by reference.

Additionally, the complex usually includes ancillary ligands that are bonded to the metal and satisfy the valence of the metal. The ancillary ligands can be labile or polymerization-stable, but usually at least one labile ligand (such as halides, alkoxys, aryloxys, alkyls, alkaryls, aryls, dialkylaminos, or the like) is present. Particularly preferred labile ligands are halides, alkyls, and alkaryls (e.g., chloride, methyl, benzyl).

The complexes can be made by any suitable method; those skilled in the art will recognize a variety of acceptable synthetic strategies. Often, the synthesis begins with preparation of the desired indenoindole compound from particular indanone and arylhydrazine precursors. Treatment with base gives a ligand precursor. The indenoindole is linked to a cyclopentadienyl group or other polymerization-stable ligand to give a linked ligand precursor. The final step normally involves reaction of the ligand precursor with a transition metal source to give the bridged transition metal complex. The exact synthetic steps and the sequence used will normally depend upon the other ligands used and the transition metal source.

The polymerization is performed in the presence of an organozinc compound. The organozinc compound is preferably a diarylzinc or a dialkylzinc, more preferably a $C_2$–$C_{20}$ dialkylzinc or a $C_{12}$–$C_{20}$ diarylzinc. Dialkylzincs such as dimethylzinc, diethylzinc or dibutylzinc are preferred. Of these, diethylzinc is most preferred. The organozinc compound is added to the polymerization mixture as a separate component from the catalyst system; it is not used to pretreat the support, complex, or both.

The organozinc compound is used in an amount effective to increase the bulk density of the ethylene polymer compared with that observed in the absence of the organozinc compound. The amount of organozinc compound added to the reaction mixture is preferably within the range of about 0.1 to about 5,000 mmol of organozinc compound per mmol of Group 3-10 transition metal; a more preferred range is from about 1 to about 500 mmol per mmol of transition metal. Bulk density is an important consideration in a commercial manufacturing process; it impacts cost, productivity, and the overall viability of the process. Preferably, the bulk density of ethylene polymers made using the process exceeds 0.25 $g/cm^3$; more preferably, the bulk density is greater than 0.28 $g/cm^3$, and most preferably it is greater than 0.30 $g/cm^3$.

Preferably, the organozinc compound is used in an amount effective to reduce the weight percentage (wt. %) of polyolefin chunks, or agglomerated polymer particles, in the ethylene polymer compared with the amount produced in the absence of the organozinc compound. Chunking interferes with the ability of the polymer particles to flow and hinders transferability. Preferably, the amount of chunks is below 0.5 wt. %; more preferably the amount is below 0.1 wt. %. Ideally, of course, there is no detectable amount of polyolefin chunks obtained from the process.

Preferably, the organozinc compound is used in an amount effective to narrow the particle size distribution of the ethylene polymer compared with the particle size distribution obtained in the absence of the organozinc compound. Narrow particle size distribution also impacts particle flowability and ease of transfer. Preferably, the particle size distribution, as measured by Malvern SPAN or other well-known techniques, is less than 3.0, more preferably less than 2.0, and most preferably less than 1.5.

The process can be used to make a variety of valuable ethylene polymers and copolymers, including, for example, high-density polyethylene (HDPE), medium-density polyethylene (MDPE), and linear low density polyethylene (LLDPE).

Ethylene polymers made using the process of the invention preferably have weight average molecular weights (Mw), as determined by gel permeation chromatography according to well-known methods, within the range of about 100,000 to about 500,000, more preferably from about 150,000 to about 400,000, and most preferably from about 160,000 to about 250,000. The polymers preferably have polydispersities (Mw/Mn) less than 4.0, more preferably less than 3.5.

The following examples merely illustrate the invention. Those skilled in the art will recognize many variations that are within the spirit of the invention and scope of the claims.

EXAMPLES

Preparation of MAO-Treated Silica

Silica (2.0 g of Cariact G-3, product of Fuji Silysia Chemical, calcined at 200° C. for 8 h) is slurried with dry toluene (18 mL) under nitrogen. Methylalumoxane (3.55 mL of 30 wt. % MAO in toluene, product of Albemarle Corporation) is slowly added to the silica slurry, and the mixture stirs at room temperature for 0.5 h. The mixture is heated to 80° C. with stirring for 2 h, then cooled to room temperature and stripped under vacuum. After drying, about 3.6 g of dry MAO-treated silica is obtained.

Preparation of Catalyst A1

In a glovebox at room temperature, a dimethylsilyl-bridged cyclopentadienyl(indeno[1,2-b]indolyl)zirconium dichloride complex, 1, prepared as described in copending application Ser. No. 10/123,774, now allowed (137 mg, 0.27 mmol) is carefully added to a solution of methylalumoxane (2.8 mL of 30 wt. % MAO in toluene) that has been further diluted with toluene (9.2 mL). After stirring for 2 h at room temperature, the mixture becomes dark violet red. MAO-treated silica, prepared as described earlier (3.0 g), is added, and the slurry is stirred at room temperature for 1 h. Toluene is stripped under vacuum at room temperature. Further drying at room temperature provides a dry beige-brown powder (4.05 g), which is the supported complex.

A solution of trityl tetrakis(pentafluorophenyl)borate (115 mg, 0.124 mmol, product of Asahi) in toluene (6 mL) is added to a portion (1.8 g) of the supported complex. After stirring for 3 h, the slurry is filtered and the solids are washed with dry hexanes (4×8 mL). The solids are dried under vacuum to obtain Catalyst A1 (1.86 g).

Preparation of Catalyst A2

The procedure used to make Catalyst A1 is repeated except that 91.5 mg (0.177 mmol) of transition metal complex and 76.5 mg (0.083 mmol) of ionic borate compound are used. The product is Catalyst A2 (1.83 g).

Preparation of Catalyst B1

In a glovebox at room temperature, a methylene-bridged bis(indeno[2,1-b]indolyl)zirconium dichloride complex, 2, is generally prepared using the convenient approach of Nifant'ev et al. described in PCT Int. Appl. WO 99/24446 as indicated in steps (a)–(d) below.

a. 5,6-Dihydro-2-methylindeno[2,1-b]indole (4). A 3-neck flask equipped with mechanical stirrer and reflux condenser is charged with 2-indanone (51.0 g, 0.39 mol) and p-tolylhydrazine hydrochloride (61.4 g, 0.39 mol). Glacial acetic acid (525 mL) is added at room temperature, and the mixture is vigorously stirred and heated to reflux. The red mixture is heated for 2 h, cooled to room temperature, and is poured into ice water (1 L). The resulting precipitate is filtered and washed with water (about 1 L). The solid is dissolved in ethyl acetate (1.4 L), activated charcoal is added, and the mixture is gently warmed, then cooled and filtered over a Celite bed. The filtrate is dried ($Na_2SO_4$), filtered, and concentrated to 450 mL, then cooled to −30° C. for 3 days. The crystalline solid is filtered and washed with cold (−78° C.) hexanes (2×500 mL). The beige solid is collected and dried under vacuum (47 g, 56%).

b. N-Methylation of 4. A 3-neck flask equipped with mechanical stirrer, dropping addition funnel, and reflux condenser is charged with a solution of NaOH (42 mL, 21.5 M, 903 mmol) followed by $C_{16}H_{33}NMe_3Br$ (0.36 g, 0.97 mmol). Indenoindole 4 (15.0 g, 68.4 mmol) is added under vigorous stir followed by toluene (50 mL). A solution of MeI (8.0 mL, 129 mmol) in toluene (15 mL) is added dropwise at room temperature, and the mixture stirs at room temperature for 2.5 h and at reflux for an hour. The mixture turns red and is cooled to room temperature and filtered. The crystalline solid is washed with cold (−30° C.) EtOH (200 mL) followed by chilled hexanes (200 mL) to afford a pale red solid (10 g, 65%), which is the N-methylated indeno[2,1-b]indole (5).

c. Preparation of methylene-bridged ligand precursor 6. A slurry of 5 (9.32 g, 39.9 mmol) in degassed DMF (150 mL) is warmed to 70° C., and NaOEt (1.37 g, 20.1 mmol) is added under $N_2$, and the solid dissolves to afford a dark orange solution. Aqueous formaldehyde (1.6 mL, 37 wt. %, 20.8 mmol) is added after an hour, and a precipitate forms after 20 min. Solid $NH_4Cl$ (2.55 g, 47.7 mmol) is added, the mixture is filtered, and the solid is washed with DMF (50 mL) followed by $Et_2O$ (50 mL). The solid is dissolved in $CH_2Cl_2$ (1.3 L) and washed with water (1 L). The layers are separated, and the organics are dried ($Na_2SO_4$) and filtered. The volatiles are removed under reduced pressure, and the solids are dried under vacuum (4.1 g, 43%) to give ligand precursor 6.

d. Preparation of zirconium complex 2. A mixture of 6 (2.18 g, 4.55 mmol) in $Et_2O$ (80 mL) is cooled to −78° C., and n-BuLi (4.0 mL, 2.5 M in hexanes, 10 mmol) is added by syringe. The cold bath is removed, and a yellow solid forms upon warming to 23° C. Volatiles are removed after 18 h, and the solid is washed with $Et_2O$ (20 mL) and dried under vacuum. The dianion (1.84 g, 3.75 mmol) is added to a solution of $ZrCl_4$ (0.88 g, 3.77 mmol) in toluene (80 mL) and $Et_2O$ (30 mL) to afford a red mixture, which is filtered after overnight stir and dried under vacuum to give the desired zirconium complex (2) (2.57 9, 78.2%).

e. Catalyst B1. Zirconium complex 2 (28 mg, 0.044 mmol) is carefully added to a solution of methylalumoxane (0.15 mL of 30 wt. % MAO in toluene) that has been further diluted with toluene (2.8 mL). After stirring for 1 h at room temperature, the mixture becomes dark green. MAO-treated silica, prepared as described earlier (1.5 g), is added, and the slurry is stirred at room temperature for 1 h. Toluene is stripped under vacuum at room temperature. Further drying at room temperature provides a light-red powder (1.65 g), which is the supported complex.

A solution of trityl tetrakis(pentafluorophenyl)borate (13.5 mg, 0.015 mmol) in toluene (2 mL) is added to a portion (0.55 g) of the supported complex. After stirring for 1 h, the slurry is filtered and the solids are washed with dry hexanes (4×3 mL). The solids are dried under vacuum to obtain Catalyst B1 (0.56 g).

Preparation of Catalyst B2

The procedure used to make Catalyst B1 is repeated except that 12 mg (0.019 mmol) of transition metal complex is used and the ionic borate compound and treatment step are omitted. Thus, after stirring the complex with MAO-treated silica, the product is vacuum dried at room temperature to give the supported complex (Catalyst B2, 1.65 g).

Preparation of Catalyst C

The procedure used to make Catalyst A1 is repeated except that a cyclopentadienyl(indeno[1,2-b]indolyl)zirconium dichloride complex, 3 prepared as described in copending application Ser. No. 10/123,774, now allowed (122 mg, 0.266 mmol) is used instead of complex 1 and the ionic borate compound and treatment step are omitted. Thus, after stirring the complex with MAO-treated silica, the product is vacuum dried at room temperature to give the supported complex (Catalyst C, 4.0 g).

Ethylene Polymerizations

Example 1

A one-liter, stainless-steel reactor having multiple injector ports is charged with 1-butene (5 mL). Triisobutylaluminum (TIBAL, 0.5 mL of 1.0 M solution in heptane, 0.5 mmol), Armostat 710 fatty amine (1 mg, product of Akzo Nobel) in heptane solution (0.25 mL), and diethylzinc in heptane (0.5 mL of 1.0 M solution) are mixed in one sidearm of the injector. The mixture is then flushed into the reactor with nitrogen pressure and isobutane (about 400 mL). The reactor is pressurized with ethylene to 310 psig, and the reactor contents are allowed to equilibrate at 75° C. Catalyst A1 (15 mg) is pre-loaded into the other injector arm and is then flushed into the reactor with isobutane (90 mL) and nitrogen pressure. After the polymerization proceeds to make about 100 g of polymer (about 15 min.), the reactor is vented and the resulting ethylene polymer is collected and dried. Activity: 21,900 g of polymer per gram supported catalyst per hour (g/g·h). See results in Table 1.

Example 2

The procedure of Example 1 is repeated except that TIBAL is omitted from the process. Activity: 16,500 g/g·h.

Comparative Example 3

The procedure of Example 1 is followed except that no diethylzinc solution is added. Activity: 23,000 g/g·h.

Example 4

The procedure of Example 1 is followed except that 15 mg of Catalyst A2 is used. Activity: 14,400 g/g·h.

Comparative Example 5

The procedure of Example 4 is followed except that no diethylzinc solution is added. Activity: 17,300 g/g·h.

Example 6

The procedure of Example 1 is followed except that 15 mg of Catalyst B1 is used. Activity: 11,000 g/g·h.

Comparative Example 7

The procedure of Example 6 is followed except that no diethylzinc solution is added. Activity: 20,100 g/g·h.

Example 8

The procedure of Example 1 is followed except that 35 mg of Catalyst B2 is used. Activity: 1,650 g/g·h.

Comparative Example 9

The procedure of Example 8 is followed except that no diethylzinc solution is added. Activity: 5,300 g/g·h.

Comparative Example 10

The procedure of Example 1 is followed except that 15 mg of Catalyst C is used. Activity: 9,800 g/g·h.

Comparative Example 11

The procedure of Comparative Example 10 is followed except that TIBAL is omitted from the process. Activity: 9,900 g/g·h.

Comparative Example 12

The procedure of Comparative Example 10 is followed except that no diethylzinc solution is added. Activity: 10,500 g/g·h.

As the results summarized in Table 1 demonstrate, the process of the invention provides valuable advantages. First, as Comparative Examples 3, 5, 7, and 9 demonstrate, the use of a bridged indenoindolyl complex provides ethylene polymers with desirably high molecular weight but unacceptably low bulk densities (typically <0.2 g/cm$^3$). Moreover, the wt. % polymer chunks produced in these comparative examples were measurable (0.8 wt. % in C3) to very high (34 wt. % in C9), and the particle size distributions were relatively high (2.5 to 3.3).

By performing the polymerizations with bridged indenoindolyl complexes in the presence of an organozinc compound, in this case diethylzinc (see Examples 1, 2, 4, 6, and 8), we observed somewhat lower catalyst activities and polymer Mw values, but big improvements in bulk densities (typically >0.3 g/cm$^3$), polymer chunk formation (typically <0.1 wt. %), and particle size distribution (typically <1.5).

Comparative Examples 10–12 show that the operability characteristics are favorable even in the absence of an organozinc compound when an unbridged indenoindolyl catalyst is used. The problem here is that the Mw values are generally too low. While it is relatively easy to reduce polymer molecular weight to a desired value by introducing hydrogen or other chain-transfer agents into the reactor, it is not so easy to boost polymer molecular weight.

In sum, the process of the invention enables the preparation of high-molecular-weight resins using bridged indenoindolyl complexes while enjoying the operability benefits normally associated only with non-bridged varieties of these complexes.

The preceding examples are meant only as illustrations. The following claims define the invention.

Organometallic Complexes Used in the Examples

-continued

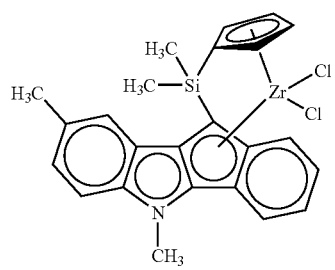

CH$_2$-bridged bis[2,1-b]

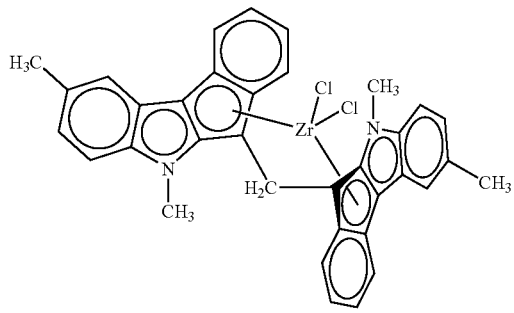

Me$_2$Si-bridged [1,2-b] Cp

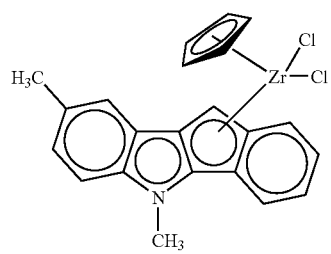

unbridged [1,2-b] Cp

TABLE 1

Effect of Diethylzinc in the Preparation of MDPE

| Ex | Catalyst | Bridged complex? | Activator | DEZ (mmol) | TIBAL (mmol) | Activity (g/g · cat · h) | $M_w$ (K) | $M_w/M_n$ | Bulk density (g/cm$^3$) | Wt. % chunks | PSD[1] |
|---|---|---|---|---|---|---|---|---|---|---|---|
| 1 | A1 | yes | MAO + F20 | 0.5 | 0.5 | 21,900 | 311 | 3.3 | 0.35 | 0 | nm[2] |
| 2 | A1 | yes | MAO + F20 | 0.5 | 0 | 16,500 | 345 | 3.2 | 0.39 | 0 | nm |
| C3 | A1 | yes | MAO + F20 | 0 | 0.5 | 23,000 | high | nm | 0.19 | 0.8 | nm |
| 4 | A2 | yes | MAO + F20 | 0.5 | 0.5 | 14,400 | 276 | 2.9 | 0.37 | 0 | 1.1 |
| C5 | A2 | yes | MAO + F20 | 0 | 0.5 | 17,300 | high | nm | 0.17 | 5.5 | 2.5 |
| 6 | B1 | yes | MAO + F20 | 0.5 | 0.5 | 11,000 | 195 | 3.3 | 0.37 | 0.5 | 1.4 |
| C7 | B1 | yes | MAO + F20 | 0 | 0.5 | 20,100 | high | nm | 0.27 | 2.1 | 3.3 |
| 8 | B2 | yes | MAO | 0.5 | 0.5 | 1,650 | 159 | 3.0 | 0.22 | 0 | nm |
| C9 | B2 | yes | MAO | 0 | 0.5 | 5,300 | 288 | 3.8 | 0.12 | 34 | nm |
| C10 | C | no | MAO | 0.5 | 0.5 | 9,800 | 163 | 2.6 | 0.29 | 0 | nm |
| C11 | C | no | MAO | 0.5 | 0 | 9,900 | 159 | 2.6 | 0.35 | 0 | nm |
| C12 | C | no | MAO | 0 | 0.5 | 10,500 | 183 | 3.5 | 0.34 | 0 | nm |

Polymerization conditions: 1-L reactor; 5 mL 1-butene; 310 psi total pressure; no added hydrogen; 490 mL isobutane, 1 mg Armostat 710 antistatic agent, 75° C..
Catalysts A1 and A2 are separate batches of Me$_2$Si-bridged Cp(indeno[1,2-b]indolyl)zirconium dichloride complex
Catalysts B1 and B2 are separate batches of CH$_2$-bridged bis(indeno[2,1-b]indolyl)zirconium dichloride complex
Catalyst C = Cp(indeno[1,2-b]indolyl)zirconium dichloride complex
[1]Particle size distribution by Malvern SPAN.
[2]Nm = not measured.

We claim:

1. A process which comprises polymerizing ethylene in the presence of an organozinc compound and a catalyst system comprising a bridged indenoindolyl Group 3-10 transition metal complex and an activator to produce an ethylene polymer having a weight average molecular weight, $M_w$, within the range of 150,000 to 400,000, wherein the organozinc compound is present in an amount effective to increase the polymer bulk density compared with that observed in the absence of the organozinc compound.

2. The process of claim 1 wherein the organozinc compound is present in an amount effective to reduce the wt. % of agglomerated polyolefin particles produced compared with the wt. % of agglomerated polyolefin particles produced in the absence of the organozinc compound.

3. The process of claim 1 wherein the organozinc compound is present in an amount effective to narrow the particle size distribution of the polymer compared with the particle size distribution obtained in the absence of the organozinc compound.

4. The process of claim 1 wherein the organozinc compound is present in an amount within the range of about 0.1 to about 5,000 mmoles per mmol of Group 3-10 transition metal.

5. The process of claim 1 wherein the organozinc compound is a $C_2$–$C_{20}$ dialkylzinc or a $C_{12}$–$C_{20}$ diarylzinc compound.

6. The process of claim 1 wherein the organozinc compound is diethylzinc.

7. The process of claim 1 wherein the catalyst system comprises a Group 4 transition metal.

8. The process of claim 1 wherein the complex is a dimethylsilyl-bridged cyclopentadienyl(indeno[1,2-b]indolyl)zirconium complex.

9. The process of claim 1 wherein the activator is selected from the group consisting of alkyl alumoxanes, alkylaluminum compounds, aluminoboronates, organoboranes, ionic borates, ionic aluminates, and mixtures thereof.

10. The process of claim 1 wherein the activator is a mixture of an alkyl alumoxane and an ionic borate.

11. The process of claim 10 wherein the activator is a mixture of MAO and trityl tetrakis(pentafluorophenyl)borate.

12. The process of claim 1 wherein the polymerization is performed in the presence of at least one α-olefin to produce an ethylene copolymer.

13. The process of claim 12 wherein the ethylene copolymer is LLDPE.

14. The process of claim 12 wherein the ethylene copolymer is MDPE.

15. The process of claim 12 wherein the α-olefin is selected from the group consisting of propylene, 1-butene, 1-hexene, 1-octene, and mixtures thereof.

* * * * *